JOSEPH ALBRIGHT.
Improvement in Molding-Machines.

No. 114,900.             Patented May 16, 1871.

Witnesses:             Inventor:

Jos. Albright.

PER

Attorneys.

UNITED STATES PATENT OFFICE.

JOSEPH ALBRIGHT, OF MIDWAY, TENNESSEE.

IMPROVEMENT IN MOLDING-MACHINES.

Specification forming part of Letters Patent No. 114,900, dated May 16, 1871.

*To all whom it may concern:*

Be it known that I, JOSEPH ALBRIGHT, of Midway, in the county of Greene and State of Tennessee, have invented a new and Improved Planing, Molding, and Tenoning Machine; and I do hereby declare the following to be a full, clear, and exact description of the same, reference being had to the accompanying drawing, making a part of this specification, in which—

Figure 1:
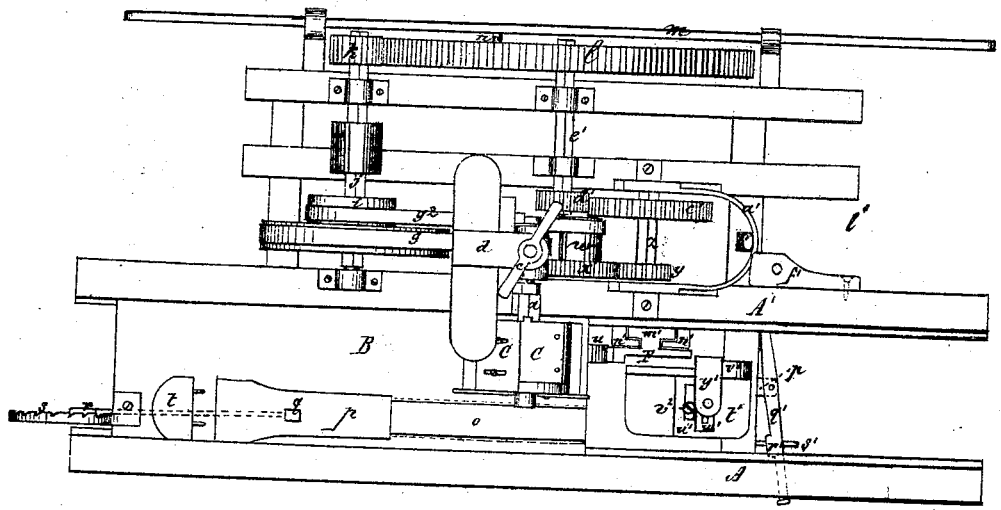
Figure 2:
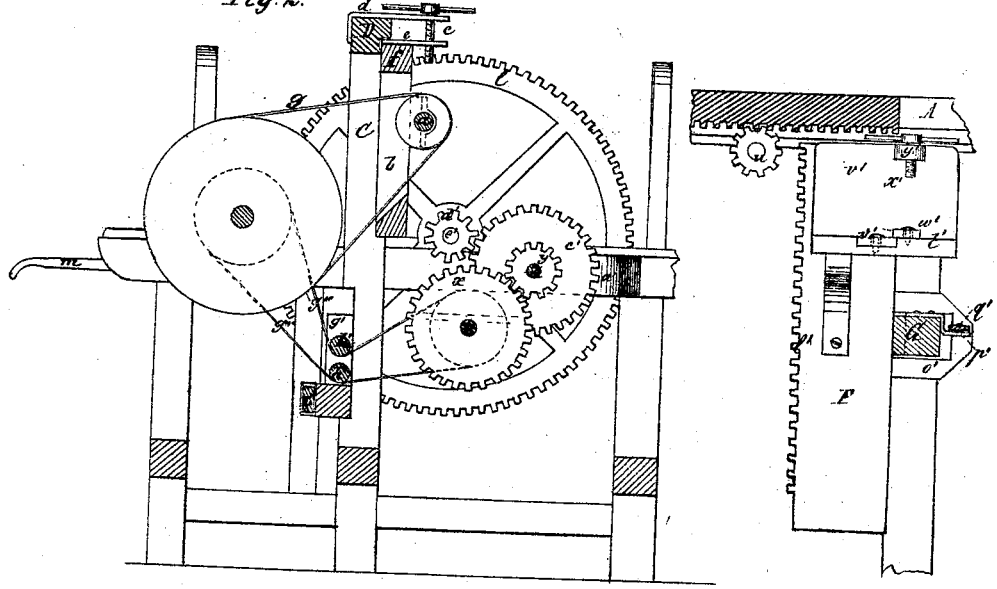

Figure 1 is a top view; Fig. 2, a longitudinal sectional elevation; and Fig. 3 is a side elevation of the vertically-reciprocating carriage.

This invention relates to a machine for planing, molding, and tenoning lumber by means of cutters of appropriate shape for doing these different kinds of work, which are all placed at different times upon the same shaft, the carriage that supports the stuff being provided with a peculiar clamping apparatus for holding the lumber while under the action of the cutter, the cutter-shaft being arranged to be raised or lowered to suit the thickness of the stuff, and the carriage that sustains the pieces while the tenons are sawing on them being arranged to be raised and lowered for the discharge of the sawing function.

Referring to the drawing, A A' are the guide-ways on which runs the sliding carriage B. This carriage supports the stuff during the tenoning operation. For moldings and cornices a longer carriage is used in the same guide-ways.

C are the cutters for tenoning, having lances at their outer ends for cutting the shoulders. These cutters are to be replaced by others of appropriate form when pieces are to be wrought into moldings or cornices.

The cutter-shaft $a$ is supported horizontally on a sash, $b$, Fig. 2, which slides between arms which hold the sash against a pair of vertical standards, C. The sash is raised or lowered, to adapt the cutters to the thickness of the stuff, by means of a screw, $c$, that passes vertically through a horizontal arm, $d$, extending from the top of the cross-piece D, and also through an arm, $e$, extending from the top of the cross-piece $f$.

The cutters are rotated by means of a belt, $g$, connecting a drum, $w$, on the cutter-shaft with a drum, $i$, on a shaft, $j$, which bears at one end a pinion, $k$, that engages with the master-wheel $l$, which latter may be worked by hand by means of a bar, $m$, pivoted to a wrist-pin, $n$, or by any other power.

In the upper side of the carriage B is a longitudinal groove, $o$, in which rests a block, $p$, from the under side of which a pin, $q$, extends downward through a slot in the carriage, which pin is connected by a rod with the lower end of a lever, $r$, that has its fulcrum at the rear end of the carriage B, and is held in any required position by means of a curved rack, $s$, also attached to the rear end of the carriage. On the upper side of the carriage B, opposite the sliding block $p$, is a fixed block, $t$, with prongs projecting from its front end.

By means of the lever $r$ and connecting-rod the block $p$ may be drawn toward or away from the block $t$, so as to clamp between the latter and itself the stuff, or to unclamp it.

The carriage B is constructed with a rack along its under side, which engages with a pinion, $u$, Fig. 1, fixed on a shaft, $v$, Fig. 2, which bears a drum, $w$, Fig. 1, and a spur-gear, $x$. The rotation, according to its direction, of the shaft $v$ feeds the carriage B forward or slides it backward. Rotation forward is communicated to said shaft from a pinion, $y$, on a shaft, $z$, the latter being supported in a sliding frame, $a'$, that is operated by a lever, $b'$. The shaft $z$ bears a spur-gear, $c'$, that, when the frame $a'$ is moved inward far enough to throw the pinion $y$ into gear with the spur-wheel $x$, engages with a pinion, $d'$, on the master-wheel shaft $e'$. A button, $f'$, when turned down behind the frame $a'$, holds the pinion $y$ and spur-gear $c'$ in connection with the spur-gear $x$ and pinion $d'$.

By this arrangement the carriage B is fed forward. To slide it backward, it is first necessary to disconnect the spur-gear $c'$ from the pinion $d'$ by raising the button $f'$ and moving the frame $a'$ backward. It is next necessary to impart to the shaft $v$ a motion in an opposite direction, which is done by tightening the belt $g''$ by means of a frame, $g'$, which slides between arms that hold it against the standards C, the frame $g'$ being furnished with the ordinary rollers $h'$, beneath which pass the branches of the belt $g$, and the said frame being operated by a lever, $k'$, whose fulcrum is in the standard E. The tightening of the belt $g''$ in this way imparts the rotation of the shaft $j$ to the shaft $v$ and slides the carriage B backward.

F, Fig. 3, is a bar having teeth $l'$ at one side, and having a T-shaped tongue, $m'$, forward lengthwise of its rear side, which tongue enters a groove of corresponding shape formed in a vertical block, $n'$, that stands between horizontal guide-bars placed at the top and bottom of said block, just beneath the inner guide-bar A. The block $n'$ has attached to it and projecting from one side a slotted plate, $o'$, which incloses the cross-piece G of the supporting-frame. An arm, $p'$, extends horizontally from the outside of the cross-piece G, which arm is the fulcrum of a lever, $q'$, whose inner end is connected with the plate $o$, and whose longer arm has on its inner side a tooth, $r'$. Said longer arm rests on an arm, $s'$, that extends outward from the cross-piece G.

By means of the lever $q'$ the block $n'$ and bar F can be moved inward until the teeth $l'$ engage with the pinion $u$. The lever $q'$ is then fastened by inserting its tooth $r'$ in a notch in the arm $s'$. As soon as the shaft $v$ is put in rotation by means of the spur-gear $c'$ and pinion $y$, as before described, the bar F begins to rise.

A plate, $t'$, is secured horizontally to the front side of the bar F, which plate is transversely grooved, the tongue $u'$ of a vertical plate, $v^1$, occupying the groove. The tongue $u'$ is slotted lengthwise, and a screw, $v^2$, passing through the slot into the plate $t'$, admits of the adjustment of the plate $v^1$ in different positions in the plate $t'$. The plate $t'$ is used for supporting pieces of wood into which kerfs are to be cut by a circular saw, occupying the place of the cutters C, for the purpose of forming the shoulders of tenons.

The block $w'$, adjustable on the plate $t'$, holds the stuff between itself and the vertical plate $v^1$, and the screw $x'$, passing through the arm $y'$, that extends from the top of the plate $v^1$, serves to hold the stuff by downward pressure. The cutting takes place as the bar F rises, and on throwing the spur-wheel $c'$ out of gear with the pinion $d'$, and releasing the tooth $r'$ from the notch in the arm $s'$, the bar F descends by its own weight. The carriage is removed when the bar F is used.

Having thus described my invention, what I claim as new, and desire to secure by Letters Patent, is—

1. The combination of the carriage B, sliding block $p$, fixed block $t$, rack $s$, lever $r$, and connecting-rod, as specified.

2. The shaft $z$, pinion $y$, spur-gear $c'$, sliding frame $a'$, button $f'$, and lever $b'$, as described.

3. The serrated bar F, slotted plate $o'$, lever $q'$, notched arm $s'$, and cross-piece G, combined as set forth.

4. The bar F, combined with the plates $t'$ $v^1$, tongue $w'$, block $w'$, and screw $x'$, as explained.

JOSEPH ALBRIGHT.

Witnesses:
 AUGUSTUS GERSTLE,
 WILLIAM ALBRIGHT.